Feb. 8, 1966    T. S. LING    3,233,979
APPARATUS FOR DEGREASING BONES
Filed Aug. 24, 1962
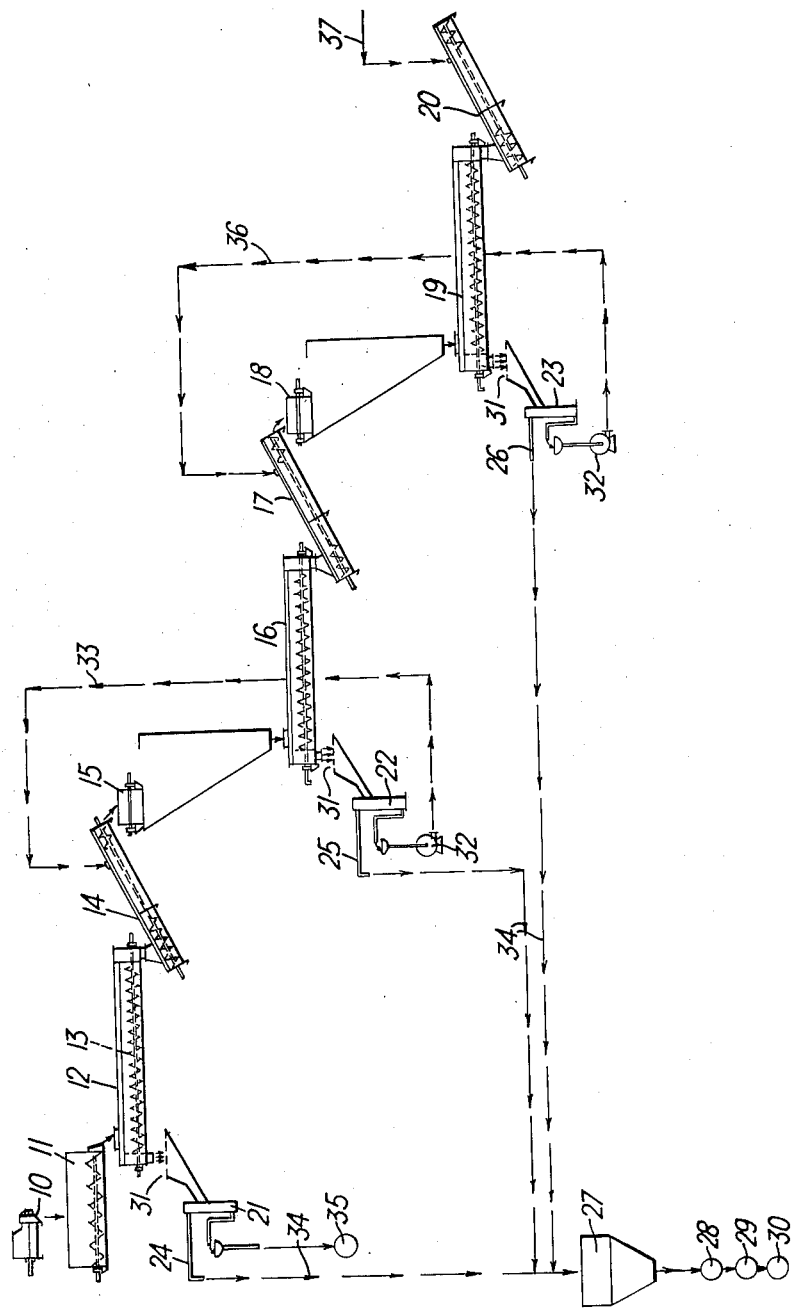
Inventor
THOMAS SYDNEY LING
By Mason, Fenwick & Lawrence
Attorneys 3,233,979
APPARATUS FOR DEGREASING BONES
Thomas Sydney Ling, Leven, Fife, Scotland, assignor to George Scott & Son (London) Limited, London, England, a British company
Filed Aug. 24, 1962, Ser. No. 220,936
2 Claims. (Cl. 23—280)

This invention relates to a method of and means for degreasing bones primarily for the production of gelatin.

When degreasing bones for the production of gelatin, it is necessary that as much fat as possible should be removed from the bones so that, when the degreased bones are treated with acid, the bones are not masked by fat and as much collagen as possible is available in the bones to yield gelatin.

The method, according to the invention, comprises the steps of crushing or breaking the bones, feeding the crushed or broken bones to a heat exchanger, conveying the bones in a continuous manner through the exchanger at a controlled temperature below that which would cause decomposition of collagen in the bones, feeding water to the heat exchanger to flow counter to the flow of bones through the exchanger and to extract fat from the bones, and removing the degreased bones from the exchanger.

Preferably, the bones are fed through at least three stages in series, a crusher or breaker and a heat exchanger being provided in each stage.

Apparatus, according to the invention, comprises a crusher or breaker for bones, a heat exchanger, means for conveying crushed or broken bones continuously through the exchanger at a controlled temperature below that which would cause decomposition of collagen in the bones, means for feeding water through the exchanger counter to the direction of flow of bones through the exchanger in such wise as to extract fat from the bones, and means for removing degreased bones from the exchanger.

An embodiment of the present invention will now be described merely by way of example, with reference to the accompanying schematic drawing of apparatus according to the present invention.

In the drawing, a crusher or breaker 10 leads, by way of a holding bin 11, to an inlet in one end of a heat exchanger 12 comprising a jacketed trough in which a hollow heated screw conveyor 13 is rotatable by a variable speed drive.

A screw conveyor 14 inclined upwardly from an outlet in the end of the exchanger 12 remote from the inlet leads to a second crusher or breaker 15 leading to an inlet in one end of a second heat exchanger 16 similar to the first exchanger. A screw conveyor 17 inclined upwardly from an outlet in the end of the second exchanger 16 remote from the inlet leads to a third crusher or breaker 18 leading to an inlet in one end of a third heat exchanger 19 similar to the first and the second exchangers. An upwardly inclined screw conveyor 20 leads to discharge from an outlet in the end of the third exchanger 19 remote from the inlet.

An outlet in the base of the end of each heat exchanger provided with the inlet leads to a separator 21, 22 and 23 respectively for fat and water, a duct 24, 25 and 26 from each of the separators leading to fat-treating means common to all the separators. The fat-treating means comprise a settling tank 27 leading to a centrifuge 28 which leads to a tank 29 containing hydrochloric acid for treatment of the fat and thereafter to a polisher 30. A vibratory screen 31 interposed between the outlet and the separator is arranged to recover small particles of meat and bone material which might overflow from the associated heat exchanger. Since this represents a very small percentage of the total feed and consists of material unsuitable for gelatine, it is passed to conventional rendering equipment for conversion into meat and bone meal.

A pump 32 associated with the separators 22 and 23 is adapted to pump water separated from fat back to the associated inclined conveyors 14 and 17 respectively.

A pump (not shown) leading to the conveyor 20 is arranged to pump fresh water at a temperature of the order of 160° F. into said conveyor and thence through the apparatus.

Each crusher or breaker and associated heat exchanger constitutes a stage, so that there are three stages in series in the apparatus.

In practice, meat and bones are fed to the first crusher or breaker 10 and thence to the holding bin 11 which incorporates a screw conveyor which progresses the crushed meat and bones to the inlet to the first heat exchanger 12 through which the crushed or broken meat and bones are conveyed continuously by the heated screw conveyor 13. Water which has previously passed through the second heat exchanger 16 is pumped by the pump 32 associated with said heat exchanger to flow, in the direction indicated by arrows 33, through the inclined conveyor 14 associated with the first heat exchanger 12 and thence through the first exchanger counter to the flow of meat and bones. The water entrains fat from the meat and bones and is discharged to the associated separator 21 from which fat is fed to the fat-treating means in the direction indicated by arrows 34 and water is fed to waste passing through a final separator 35 for removal of any remaining meat and bones. Small particles of meat and bones overflowing from the exchanger 12 pass with the water and fat to the screen 31 whence the particles are discharged for rendering into meal. The meat and bones flow through the outlet from the first exchanger for conveyance by the associated inclined conveyor 14 to the second crusher or breaker 15 where they are subjected to further crushing and compression which assists in the removal of further fat and thence to the second heat exchanger 16, the crusher being designed to minimise the production of fines and thus avoid later losses. The process is then as described in connection with the first heat exchanger except that water separated from the fat is pumped in the direction indicated by arrows 36 to the inclined conveyor 17 by the pump 32 associated with the third heat exchanger 19 and as aforesaid water separated from the fat is pumped, as indicated by arrows 33, to the inclined conveyor 14 associated the first exchanger 12. Meat and bones flow through the outlet from the second heat exchanger 16 for conveyance by the conveyor 17 to the third crusher or breaker 18 and thence to the third heat exchanger 19. The process is then as described in connection with the first and the second exchangers except that water is pumped, as indicated by arrows 37 at a temperature of the order of 160° F. to the inclined conveyor 20 associated with the third exchanger, and as aforesaid water separated from the fat is pumped, as indicated by arrows 36, to the inclined conveyor 17 associated with the second exchanger 16. Degreased bone is then conveyed by the inclined conveyor 20 associated with the third exchanger for treatment with acid to yield gelatin.

The temperature of the conveyor in each exchanger does not exceed 185° F., so that collagen in the bones is not decomposed. Also, the speed of rotation of the conveyor in each exchanger is maintained sufficiently slow so that the fat does not emulsify and is readily separated by the water from meat and bones in the exchangers.

Some advantages of the invention are that treatment of the meat and bones in three stages ensures that the bones leaving the third stage are of substantially regular size with the minimum of fines, thus preventing waste during acid treatment of the bones, the maximum amount of fat is removed from the bones so that the bones are not masked during acid treatment, and the bones are not subjected to high temperature which would decompose the collagen, resulting in the maximum amount of collagen being available for gelatin.

What is claimed is:

1. Apparatus for continuous degreasing of bones, including a plurality of progressive stages in series, there being a first, a terminal and at least one intermediate stage, each stage including a crusher and a breaker for bones and a heat exchanger, means for maintaining the temperature within the heat exchanger below that which could cause decomposition of collagen in the bones, means for conveying the crushed and broken bones continuously through the heat exchanger, means for feeding water into each stage to flow counter to the flow of bones, and separating means for separating out any fat carried by the water upon discharge from the heat exchanger, means being provided for recirculation of water between heat exchangers of the first and intermediate stages, and means supplying non-recirculated water to the terminal stage.

2. Apparatus as claimed in claim 1, in which there are three progressive stages provided, a pump to feed water to the terminal stage, and a plurality of pumps supplying the separated recirculation water from the intermediate and terminal stages to the first and intermediate stages respectively.

References Cited by the Examiner

UNITED STATES PATENTS

| | | | |
|---|---|---|---|
| 2,395,900 | 3/1946 | Mueller | 260—412.6 |
| 2,580,049 | 12/1951 | Sifferd et al. | 260—412.6 |
| 2,635,104 | 4/1953 | Chayen | 260—412.6 |
| 2,667,500 | 1/1954 | Mortenson | 260—412.6 |
| 2,745,856 | 5/1956 | Dayen et al. | 260—412.6 |
| 3,087,945 | 4/1963 | Schellenberg | 260—412.6 |

CHARLES B. PARKER, *Primary Examiner.*

ABRAHAM H. WINKELSTEIN, *Examiner.*

ALVIN E. TANENHOLTZ, ANTON H. SUTTO,
*Assistant Examiners.*